United States Patent [19]

Barr

[11] Patent Number: 4,995,522

[45] Date of Patent: Feb. 26, 1991

[54] BOTTOM DUMPING BULK CONTAINER APPARATUS

[76] Inventor: Fraser M. Barr, 3916 Sharon Place, West Vancouver, British Columbia, Canada, V7V 4T6

[21] Appl. No.: 341,976

[22] Filed: Apr. 24, 1989

[51] Int. Cl.[5] .................... B65G 67/58

[52] U.S. Cl. .................... 220/1.5; 222/185; 222/485; 222/504

[58] Field of Search .................... 220/1.5; 222/608, 185, 222/484, 485, 503, 504

[56] References Cited

U.S. PATENT DOCUMENTS

| | | | |
|---|---|---|---|
| 530,537 | 12/1894 | Lancaster . | |
| 1,216,665 | 2/1917 | Donofrio . | |
| 1,612,590 | 12/1926 | Lucka | 222/503 |
| 1,850,589 | 3/1932 | Tourneau | 222/185 |
| 2,036,170 | 3/1936 | Fildes | 294/71 |
| 2,127,810 | 8/1938 | Ditchfield | 221/144 |
| 2,177,313 | 10/1939 | Beauchamp | 221/144 |
| 2,801,126 | 7/1957 | White et al. | 294/71 |
| 2,836,454 | 5/1958 | Johansson | 294/69 |
| 2,837,369 | 6/1958 | Stopps | 294/69 |
| 3,125,254 | 3/1964 | Schuette | 222/185 |
| 3,343,725 | 9/1967 | Cannon | 222/485 |
| 3,396,675 | 8/1968 | Stevens | 222/503 |
| 3,497,109 | 2/1970 | Leach | 222/144.5 |
| 4,009,906 | 3/1977 | Sweet | 222/504 |
| 4,138,163 | 2/1979 | Calvert | 220/1.5 |
| 4,174,792 | 11/1979 | Jones | 222/608 |
| 4,338,058 | 7/1982 | Davenport | 222/503 |
| 4,359,176 | 11/1982 | Johnson | 222/504 |
| 4,423,831 | 1/1984 | Sipley | 222/185 |

*Primary Examiner*—Stephen Marcus
*Assistant Examiner*—S. Castellano
*Attorney, Agent, or Firm*—Shlesinger & Myers

[57] ABSTRACT

The invention provides a shipping container apparatus for bulk granulated material, the apparatus having a lower wall with discharge openings therein. Doors are provided for opening and closing the discharge openings, the doors being actuated by an actuating structure which is mounted for vertical movement relative to the container apparatus. The actuating structure has upper portions which serve as conventional lifting connectors or receptacles at corners of the container, which cooperate with conventional hooks or dogs of a conventional container lifting apparatus, so that raising the actuating structure opens the doors, and lowering the actuating structure closes the doors. This permits granulated material within the container to be dumped into a lower container or conveyance without requiring any specialized lifting or opening equipment.

21 Claims, 6 Drawing Sheets

BOTTOM DUMPING BULK CONTAINER APPARATUS

BACKGROUND OF THE INVENTION

The invention relates to a cargo container apparatus as used in marine and automotive truck applications, the apparatus being adapted to carry and dump bulk granulated material Much of the worlds' grain, minerals or other granulated material is transported on water by bulk marine carriers, and on land by railway tanker cars. When granulated material arrives in tanker cars at a terminal facility at a dockside, it is often unloaded by dumping through discharge openings in a bottom wall thereof, termed "bottom dumping". The granulated material is emptied from the tanker cars onto conveyors, etc. for loading into an elevator, or open piles, and is then loaded into a bulk marine carrier. The specialized terminal facilities for transferring grain, etc. from tanker cars to elevators as described above is costly, and is only cost effective when handling relatively large quantities of material. Furthermore, particularly with food grain material that might be damaged by dampness, it is usual to agitate the material by pouring it through air from one location in the elevator to another. In this way, excessive dampness is removed by the ambient air, and the growth of mold, fungus, etc. is reduced or eliminated.

When relatively small quantities of granulated material are to be handled or shipped, handling and storage costs increase considerably when compared with the larger quantities that are economical with the specialized bulk handling facilities. In order to reduce the cost of handling relatively small quantities of granulated material, the present inventor proposes modifications to conventional goods container apparatus, which are normally used for handling packaged or non-bulk goods which require individual loading into containers usually using forklift trucks.

Conventional goods containers, are, in general, unsuitable for handling bulk granulated material for several reasons as follows. Most containers have a pair of hinged doors provided at one end of the container, and thus material can only be emptied or loaded through these doors. Consequently, to empty a prior art container filled with granular material, the container would have to be grasped by a gripping or lifting head of a container handling equipment, eg a crane, so that the closed end of the container is raised above the open end, to permit the material to discharge through the open end of the container. This would be inconvenient in any facilities which tend to be restricted on space.

To the inventor's knowledge, food grain materials are not shipped in any quantity by conventional containers. If food grain were stored or shipped in such containers, agitation of the grain to prevent damage from dampness as described would be difficult as emptying containers through the doors at the end of the container is difficult. Because containers are usually stacked four or five containers high in the storage facility, transferring grain from one container to another to permit air drying as described above would be difficult. Furthermore, it would require considerable space, skill and manpower to ensure the grain is handled without excessive loss of grain, or damage to the containers.

While some containers are provided with openings in an upper wall thereof, to the inventor's knowledge no containers are provided with bottom dumping facilities which can be used for discharging granulated material from the container.

SUMMARY OF THE INVENTION

The invention reduces difficulties and disadvantages associated with the prior art by providing a container assembly which permits self-dumping through discharge openings in a bottom wall thereof, without requiring any additional equipment in the container handling facility. The container can also has openings in an upper wall thereof which are preferably vertically aligned with the openings in the bottom wall. In this way, the containers of the invention can be stacked one on top of the other, and grain in an upper container can be easily discharged from the upper container to a lower container without lifting the containers, so as to permit aeration of the grain, reducing humidity thereof, and the risk of damage resulting from dampness. The openings in both the upper and lower walls of the container apparatus, and the means to operate the openings, do not project beyond the normal upper and lower walls of the apparatus. Thus, when the openings are closed, the container can function as a conventional container and all connections with adjacent containers and conventional handling equipment remain unchanged.

The container apparatus according to the invention has generally horizontal, spaced apart, top and bottom walls and vertical walls connecting the top and bottom walls. The bottom wall has at least one discharge opening therein communicating with an interior of the container apparatus. The apparatus also includes door means, actuating means and transmission means as follows. The door means is for opening and closing the discharge opening, and is moveable relative to the discharge opening in the bottom wall. The actuating means are for controlling opening and closing of the discharge openings, and cooperate with, and are mounted for vertical movement relative to, the container apparatus. The transmission means are for moving the door means in response to the said vertical movement of the actuating means and cooperate with the actuating means and the door means. In this way, a conventional lifting head or hooks, dogs etc., of a container handling apparatus, such as a crane, can be used to move the actuating means so as to open and close the door as required.

A detailed disclosure following, relating to drawings, describes a preferred embodiment of the invention which is capable of expression in structure other than that particularly described and illustrated.

DETAILED DISCLOSURE

Figures 1, 11:
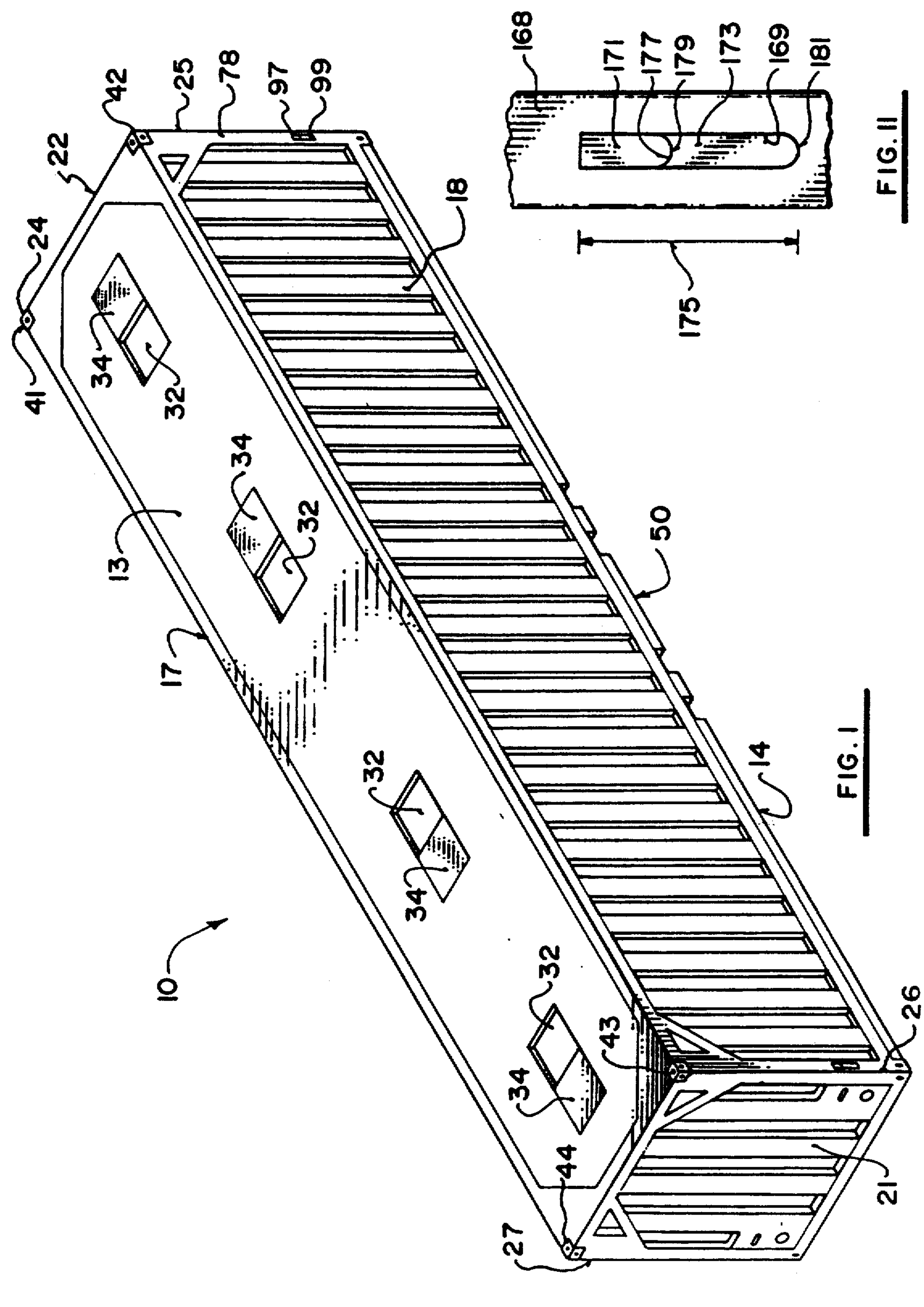
FIG. 1 is a simplified isometric view of a container apparatus according to the the invention.
FIG. 11 is simplified fragmented elevation of an alternative stop and locking structure associated with a door actuating means.
Figure 2:
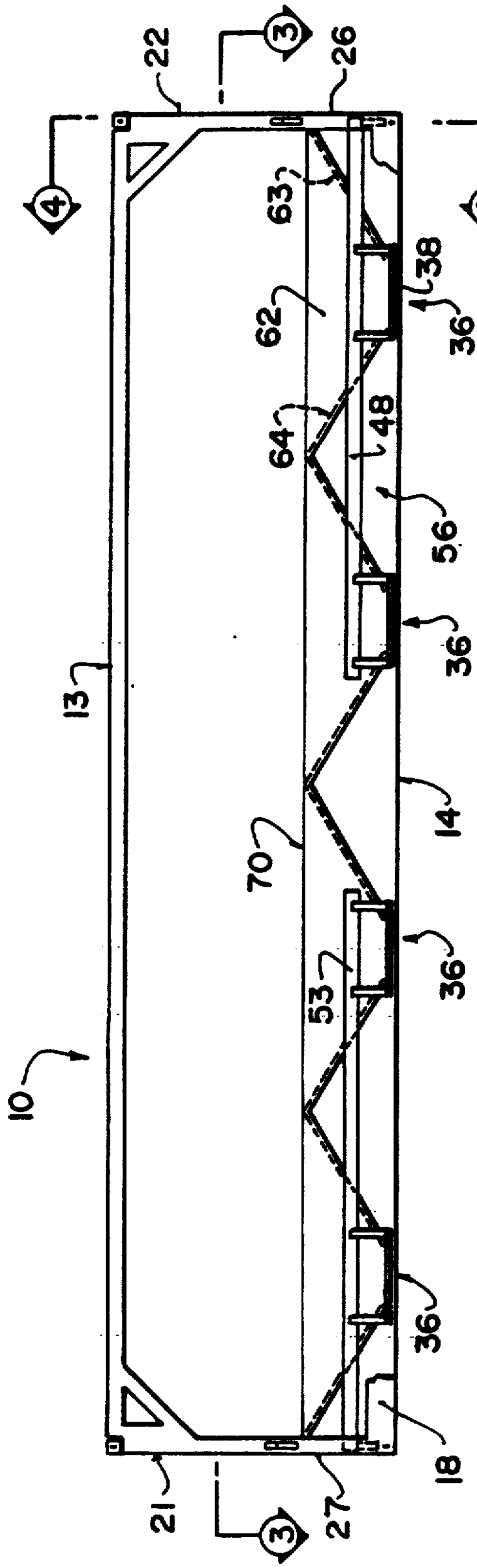
FIG. 2 is a simplified side elevation of the apparatus on a vertical plane, showing some detail of door and hopper means in a bottom wall thereof, an exterior front wall being omitted for clarity.
Figure 3:
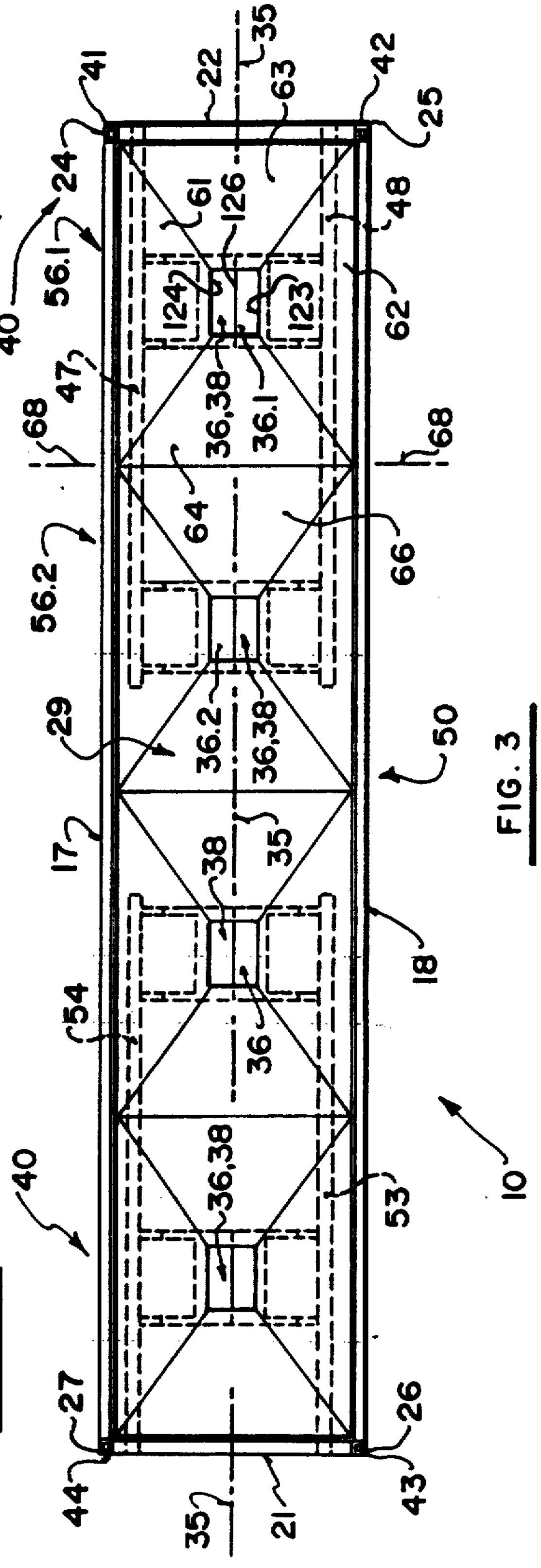
FIG. 3 is a simplified longitudinal section on a horizontal plane, as seen from line 3—3 of FIG. 2, cross-hatching being omitted for clarity.

FIGS. 1 through 3

A container apparatus 10 according to the invention has spaced apart top and bottom walls 13 and 14, first and second parallel side walls 17 and 18, and first and second spaced apart parallel end walls 21 and 22. The sidewalls and endwalls are perpendicular to each other and to the top and bottom walls to define a generally rectangular-shaped container, the walls intersecting at four vertical corners 24, 25, 26 and 27. The walls 13, 14, 17, 18, 21 and 22 define an interior 29 of the container and have dimensions which equal those of a conventional standard 40 foot goods or cargo container as used throughout the world for shipping goods on marine container vessels, road vehicles and railway vehicles. While the invention is disclosed for use with a container which is equivalent to a 40 foot container, the invention could be embodied in a standard 20 foot container or any other container of suitable size and shape.

As seen in FIG. 1, the upper wall 13 has an array of four upper wall openings designated 32 which are fitted with upper wall doors 34 which are adapted to slide over the openings 32 to close the openings as required. Structure for operating the doors 34, usually by sliding, is well known and is manually operated directly as required.

The lower wall 14 has an array of lower wall discharge openings 36, which openings are aligned vertically with the corresponding upper wall openings 32 to permit transfer between vertically stacked containers as will be described. The lower wall openings 36 are symmetrical about a central longitudinal axis 35 of the container and are provided with door means 38 for opening and closing the discharge opening as required. The door means are mounted adjacent the lower wall of the container and are moveable relative to the discharge opening to open and close discharge opening as required. Each door means 38 includes a pair of oppositely disposed first and second door members which can slide transversely of the container apparatus in opposite directions concurrently to open and close the respective discharge opening. The apparatus includes a lower wall door opening structure, which will be described in greater detail with reference to FIGS. 4 through 10.

The door opening structure includes door actuating means 40 which includes first and second actuating shafts 41 and 42 located adjacent to the vertical corners 24 and 25 of the container adjacent the right hand end thereof, and third and fourth actuating shafts 43 and 44 located adjacent the corners 26 and 27 at the opposite left hand end of the container. Upper ends of the shafts only are designated in FIGS. 1 and 3, and the shafts and associated structure will be described in greater detail with reference to FIGS. 4, 9 and 10. The upper ends of the shafts 41 through 44 are located in exactly the same place as the conventional lifting connectors or receptacles at the corners of conventional goods containers, which are adapted to cooperate with a conventional ISO twist look device hook or dog of a conventional container lifting apparatus, such as a lifting head of a container crane, or a top pick gantry, etc.

Referring to the right-hand end of the container as shown in FIG. 3, first and second connecting shafts 47 and 48 (shown in broken outline) extend from adjacent the actuating shafts 41 and 42 respectively inwardly towards a central portion 50 of the container. As seen in FIGS. 2 and 3, the shafts 47 and 48 are parallel to each other, and parallel to the bottom wall 14 and spaced closely thereto. The left-hand end of the container apparatus 10 similarly has third and fourth connecting shafts 53 and 54 (broken outline) which extend inwardly from third and fourth actuator shafts 43 and 44 respectively. The connecting shafts 47, 48, 53 and 54 are mounted in transmission housing 56 to protect the shafts and related structure from contamination of material within the container. The transmission housings and associated pair of shafts and structure are similar, and thus one portion only will be described, for example a first transmission housing 56.1, which is generally adjacent the end wall 22 and associated with a first discharge opening 36.1. It can be seen that the second connecting shaft 48 extends to a second discharge opening 36.2 which is provided with generally similar lower door means, which are also controlled by the shaft 48. Thus, actuation of the door means 38 associated with the opening 36.1 concurrently actuates the similar door means associated with the opening 36.2.

The first transmission housing 56.1 includes first and second inclined chute wall members 61 and 62 inclining inwardly and downwardly from the first and second side walls 17 and 18 respectively. The transmission housing 56 also includes third and fourth inclined chute wall members 63 and 64 which are inclined inwardly and downwardly from the second end wall 22, and from an adjacent oppositely inclined chute wall 66 respectively. The wall 66 is one wall of an adjacent second transmission housing 56.2 which is essentially a mirror image of the first transmission housing as described, about a transverse axis 68. Upper outer walls of the chute wall members 61, 62, 63 and 64 are all within a horizontal plane 70, see FIG. 2, so that the four chute members form a rectangular-sectioned hopper to direct material within the container toward the discharge opening 36. Thus, each inclined chute wall member also serves as a portion of a hopper·means as well as a portion of a transmission housing to protect the transmission against contamination. It can be seen that a portion of the transmission housing includes at least one inclined chute wall member extending between a vertical wall and a bottom wall of the container adjacent a discharge opening of the container so that portions of the chute wall, the bottom wall and the side wall define an enclosure to receive the connecting shaft passing therethrough.

As best seen in FIG. 2, the remaining discharge openings 36 have respective similar hopper means which also serve as transmission housings to protect structure for opening the door as will be described. The actuating means 40 for controlling opening and closing of the discharge openings are located at each corner of the apparatus, and are essentially identical. Thus only the actuating means at the corner 25 adjacent the second side wall 18 and the second end wall 22 will be described in detail as below.

Figure 4:
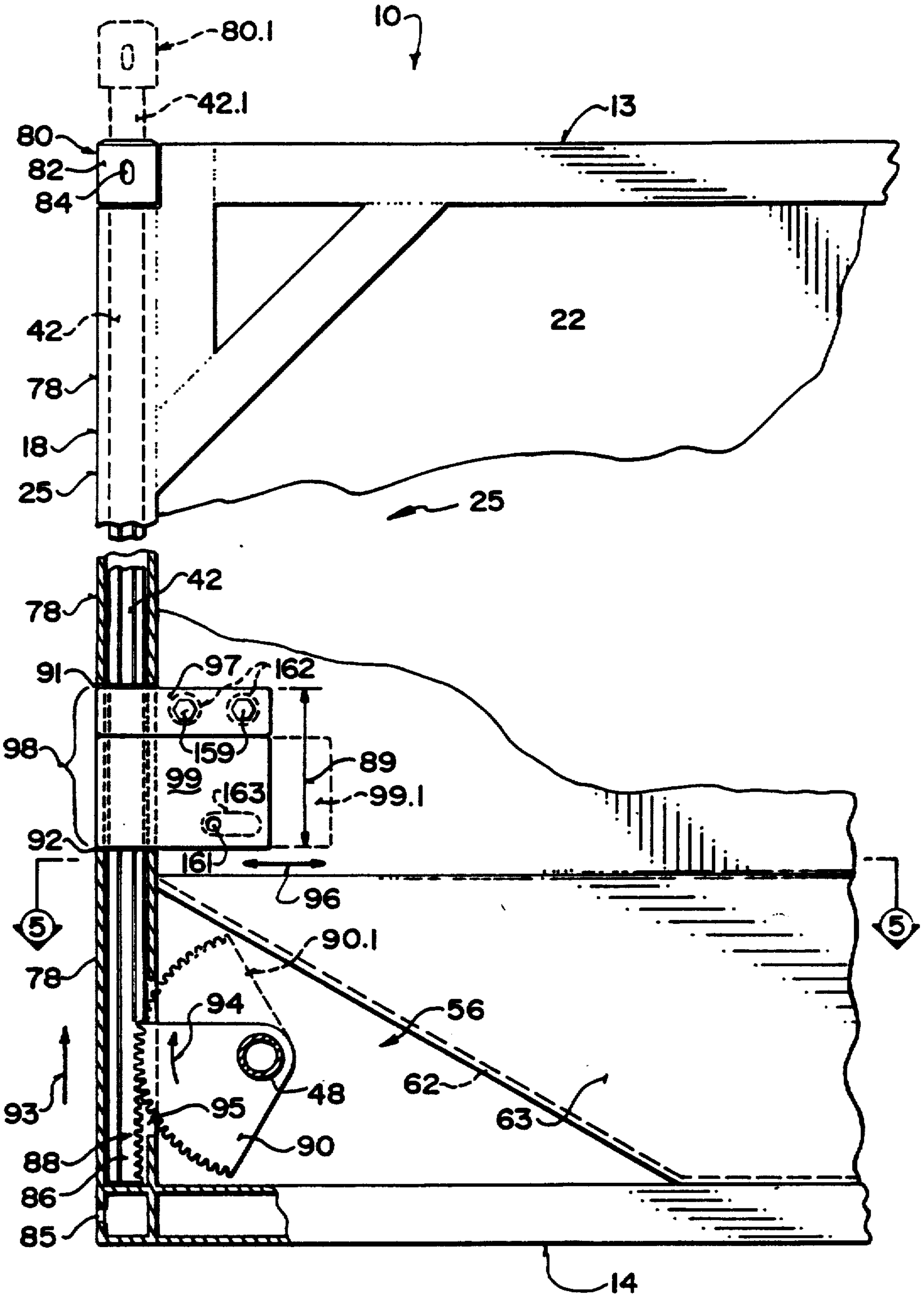
FIG. 4 is a simplified fragmented partial elevation and partial transverse section of an edge of the container adjacent a corner thereof, showing one door actuating means in two positions, as would be seen from line 4—4 of FIG. 2.
Figure 5:
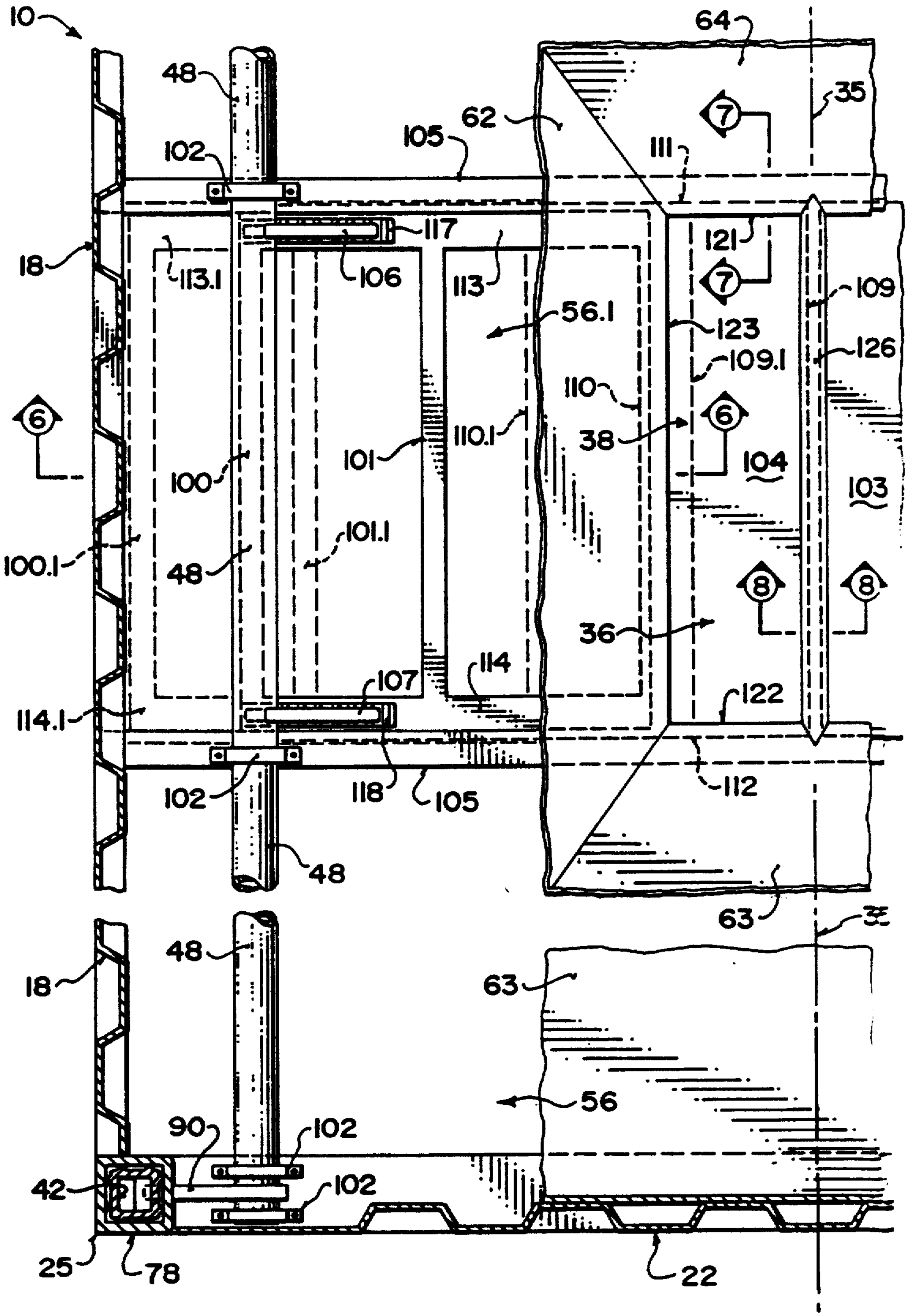
FIG. 5 is a simplified fragmented top plan of a portion of a bottom wall of the container as seen from line 5—5 of FIG. 4, showing a door means within the lower wall, and structure associated with opening and closing the door means, the door means being shown in a closed position in full line, and an open position in broken line.
Figure 6:
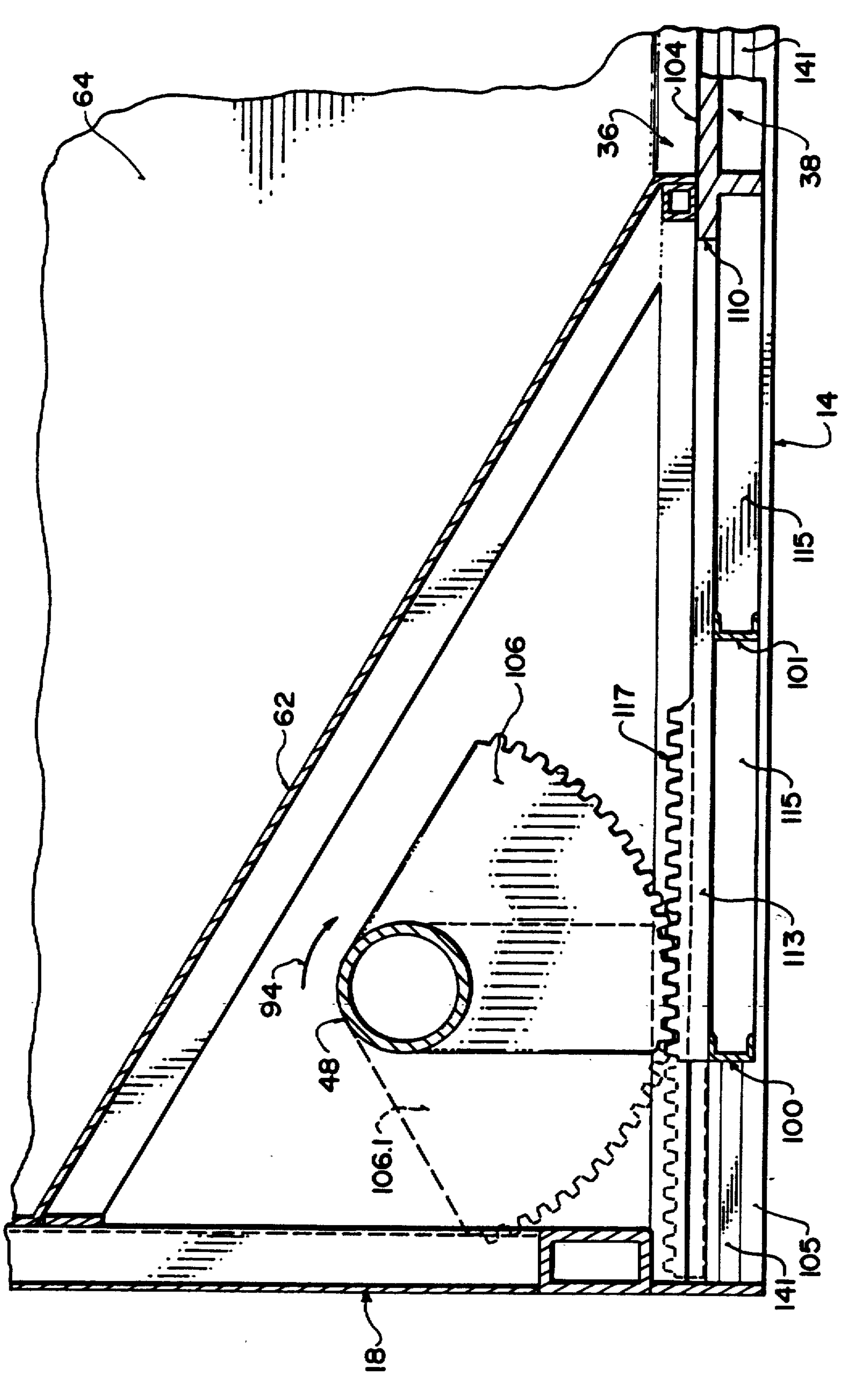
FIG. 6 is a simplified fragmented transverse section through the door means and associated structure, as seen from Line 6—6 of FIG. 5.

FIGS. 4 through 6

Referring to FIG. 4, the corner 25 contains a generally square-sectioned shaft guide box 78 which receives the second actuating shaft 42 as an axial sliding fit therein while preventing rotation of the shaft within the box. The shaft 42 has an upper end 80 having the conventional ISO lifting connector or receptacle 82 which is complementary to the conventional hook or dog of a conventional container lifting apparatus. The end 80 has three oval openings 84 disposed on two vertical sides and on the upper surface thereof, so as to permit engagement with the conventional dogs from three different directions. The actuating shaft is mounted for axial movement within the box within limits as will be defined. A similar oval opening 85 is shown adjacent a lower portion of the corner 25. Peripheral edges at the upper end 80 are bevelled to reduce interference when stacking containers one on top of the other.

The actuating shaft 42 has a lower end portion 86 having a shaft rack 88 having a plurality of gear teeth disposed linearly therealong. A shaft pinion means 90, which is a quadrant of a circular pinion with gear teeth extending over an arc of about sixty degrees, is mounted on the second connecting shaft 48 for rotation therewith. A lower end wall portion of the shaft guide box 78 is provided with a clearance opening 95 to permit the pinion means 90 to engage the rack 88. The quadrant is shown in full outline in a lower position and in engagement with an upper portion of the rack which represents a door closed position as will be described.

When the actuating shaft is moved axially upwards per arrow 93 to an upper position thereof, shown in broken outline at 42.1, the pinion means rotates per arrow 94 to assume a broken outline raised position 90.1, which represents a door open position as will be described. In the raised position, it can be seen that there is no interference between the inclined chute wall 62 and the pinion means. Thus, the connecting shaft 48 cooperates with the actuating means 42, through the rack and pinion means associated therewith, so as to rotate in response to vertical movement of the actuating means. There is usually sufficient friction in the transmission, doors, etc. to permit the shaft to remain in the raised position without use of locking means, etc.

As best seen in FIG. 4, the shaft 42 is shown locked in a lowered position by a shaft locking means 99 which is slideable longitudinally per arrow 96 across a portion of the shaft 42 between an extended or operative position shown in full outline, and a retracted or inoperative position shown partially in broken outline at 99.1. The apparatus also includes a shaft stop means 97, which is permanently located above and closely adjacent to the locking means to extend across a portion of the shaft 42 as shown. The shaft 42 has a longitudinally extending clearance slot 98 defined by an undesignated longitudinal wall extending between upper and lower shoulders 91 and 92 respectively. Spacing between the shoulders 91 and 92 defines length 89 of the slot, and it can be seen that the slot is asymmetrical with respect to the shaft 42. The stop means and locking means have respective vertical depths, and an upper surface of the locking means is closely adjacent a lower surface of the stop means. Sum of the vertical depths of the stop means 97 and the locking means 99 is approximately equal to the length 89 of the slot 98, so that stop means and locking means can occupy space between the shoulders of the slot when the locking means is extended into an operative position as shown. Outer end faces of means 97 and 99 do not project beyond the plane of the sidewall 18 to avoid interference with other structure. Further details of the shaft locking means and shaft stop means will be described with reference to FIG. 10.

When locked in the lowered position as shown, the oval openings 84 at the upper end portion 80 of the actuating shaft are located in the same position as the identical openings of a conventional cargo container. Thus, when the shaft 42 is locked in the lowered position, the container apparatus 10 can be handled as a standard container with closed openings in the bottom wall thereof. When the shaft lock means 99 is retracted to disengage from slot 98 of the shaft 42, as will be described with reference to FIG. 10, the shaft 42 can move upwardly to the raised position 42.1, rotating the pinion means 90 carried on shaft 48 to open doors as will be described. It can be seen that the locking means 99 can be used to prevent axial movement of the actuating means, i.e. the shaft 42, and cooperates with structure adjacent at least one wall of the container and the actuating means. The means 99 can be extended and brought into engagement with the actuating means to prevent movement thereof.

Referring to FIG. 5, the shaft 48 is shown journalled for rotation in a plurality of aligned bearings 102 and carrying a pair of spaced similar door pinion means 106 and 107 which are mounted on the shaft for rotation therewith. As seen in FIG. 6, the door pinion means 106 is a quadrant of a circular pinion with a plurality of gear teeth which extend over approximately sixty degrees of arc of the pinion circumference. In FIG. 6, the pinion means 106 is shown disposed in an inward position, which reflects closure of the door 38, and it can be seen that there is no interference with the inclined wall member 62. When the shaft 48 is rotated in the direction of the arrow 94 to open the door, as will be described, the pinion 106 swings to an outwardly disposed position 106.1. Thus, the inclined chute wall members are spaced sufficiently apart from the side wall and the bottom wall so as to provide clearance for the door pinion, and to enclose the door pinion to prevent contamination of the door pinion and respective door rack.

Referring again to FIG. 5, the door means 38 associated with the housing 56.1 includes first and second similar door members 103 and 104 which cooperate with each other on opposite sides of the axis 35 to open and close the discharge opening 36. Structure associated with opening and closing the door members 103 and 104 is essentially identical, but is a mirror image about the longitudinal axis 35 of the container, and thus only structure associated with the second door member 104 will be described in detail.

The door member 104 is generally rectangular in plan, and has parallel inner and outer margin portions 109 and 110 which are disposed longitudinally of the container apparatus, the inner portion 109 being shown in broken line. The door member 104 has first and second transverse margin portions 111 and 112 (shown in broken line) which are disposed transversely of the container apparatus and are disposed in line with the direction of transverse movement cf the door member. First and second parallel door extensions 113 and 114 are straight strips which are interconnected by door stiffeners 100 and 101 which are disposed parallel to the axis 35. The extensions 113 and 114 extend outwardly from the outer margin portion 110 towards the wall 18 of the container, and have upper surfaces provided with door racks 117 and 118 respectively. The door racks have gear teeth which mesh with corresponding teeth on the door pinions 106 and 107 respectively, as seen also in FIG. 6. The door stiffeners 100, 101, the door margins 109, 110, and door extensions 113 and 114 are shown in positions 100.1, 101.1, 109.1, 110.1, 113.1 and 114.1 which represent their respective positions when the door 104 is almost fully open.

The lower wall discharge opening 36 has first and second parallel transverse edge portions 121 and 122, respectively, and a longitudinal edge portion 123 generally adjacent and parallel to the side 18, and a similar longitudinal edge 124 (FIG. 3 only) parallel to and generally adjacent the side 17. A longitudinally extending door support 126 extends along the central axis 35 of the container and midway between the longitudinal edges 123 and 124, i.e. the support 126 passes across the door opening at the middle thereof. When the door members 103 and 104 are closed as shown in FIG. 5, inner margin portions of the doors are closely adjacent to each other and supported on the door support 126, as will be described with reference to FIG. 8.

Figure 7:
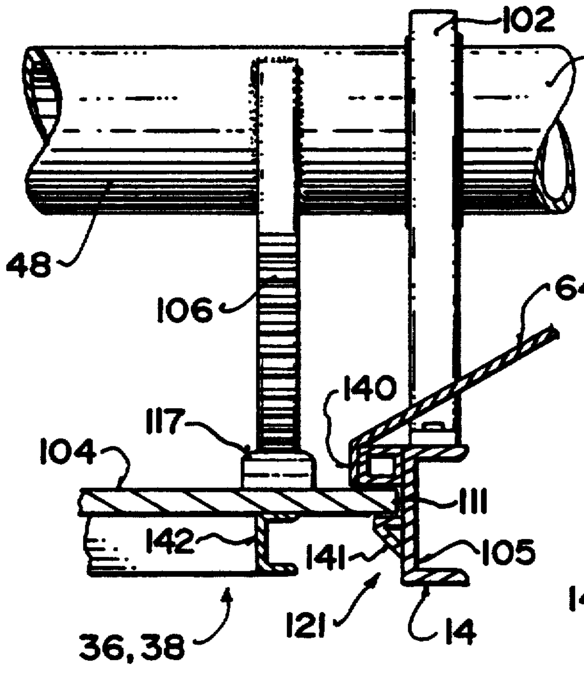
FIG. 7 is a simplified fragmented section through one side margin of a door and associated discharge opening structure, as seen from Line 7—7 of FIG. 5.
Figure 8:
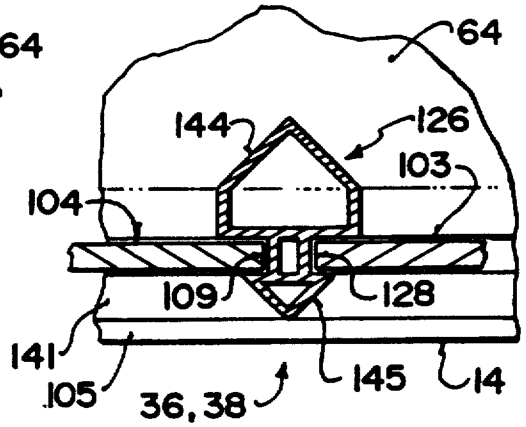
FIG. 8 is a simplified fragmented section of a door outer margin portion as seen from Line 8—8 of FIG. 5.

FIGS. 7 and 8

Referring to FIG. 7, the first transverse edge portion 121 has an upper edge portion 140, which forms a lower edge of the inclined chute wall member 64, and is adapted to, overlap the first margin portion 111 of the door means 38. The first transverse opening edge portion 121 has a lower edge portion 141 which projects upwardly from the bottom wall 14 to provide a horizontal shelf which receives and supports the first margin portion 111 of the door member 103. It can be seen that the upper edge portion 140 projects inwardly towards the centre of the door means an amount greater than the lower edge portion 141, i.e. the upper edge portion 140 overhangs the lower edge portion 141, which assists in preventing contamination of the lower edge portion when the door is opened and material is being discharged through the door opening. In any event, material resting on the lower edge portion tends to be displaced by movement cf the door means. A door stiffener 142 is positioned below the rack 117 to resist deflection of the door. It can be seen that the door means 104 is positioned above the bottom wall 14 of the container apparatus and does not project below the bottom wall. Consequently, it can be seen that the lower door means 38 do not interfere with normal operation of the container as they do not project outwardly from the bottom wall 14.

Referring to FIG. 8, when the door member 104 is closed, the inner margin portion 109 of the door member is supported on the longitudinal door support 126 which has an upper support portion 144 which overlaps a portion of the margin portion 109. The door support 126 has a lower support portion 145 which engages a portion of a lower surface of the margin portion 109, to support the door member against deflection due to weight of material acting downwardly on the door member 104 when the container is loaded. Similarly to the transverse opening edge 121, the upper support portion 144 extends beyond the lower support portion 145, i.e. overhangs the lower support portion, so as to reduce chances of material accumulating on the lower edge portion, which would tend to interfere with the door as it traverses the opening to close the opening.

Thus, the transverse opening edge portions 121 and 122 are generally similar, and support the margin portions 111 and 112 of the door member and concurrently serve as door guide means which extend adjacent to the discharge opening to mount the door means for sliding movement over the discharge opening. When the door means is closed, the outer margin portion 128 is also supported on the longitudinal door support 126, which assists in sealing both the door members, together with resisting deflection of the door members due to weight of material acting thereon.

In summary, it is seen that the transverse opening edge portions have first and second door guide located on opposite sides of the discharge opening, the door guide means on one side of the axis 35 being aligned with door guide means on an opposite side of the opening to receive the respective door means 103 and 104 therein. It can be seen that the oppositely disposed first and second transverse margin portions of the door member are mounted in the first and second door guide means respectively to permit the door means 38 to move between a retracted or open position, and an extended or closed position. In the extended position the inner margin 109 is adjacent the central axis 35 of the container, and a similar inner margin of an adjacent door member 103 on an opposite side of the opening is also adjacent the axis 35, thus closing the door opening 36. Clearly, simultaneous movement of the actuating shafts adjacent one end of a container produces aligned movement of the first and second door members 103 and 104 towards each other to close the opening, and aligned movement away from each other to open the opening. It can also be seen that the inclined chute wall members 63 and 64, in combination with the chute wall members 61 and 62, serve two main purposes as follows.

The first main purpose relates to discharging material from the apparatus. Because the chute wall members are all inclined relatively steeply to the horizontal, most of the material within the container is fed relatively quickly and efficiently through the discharge opening. Because there are essentially no horizontal surfaces within the apparatus, there are few places for residual material to collect when the apparatus has been emptied. This aspect resembles discharge and hopper structure within a conventional grain tanker car.

The second main purpose of the chute wall members is to protect from material contamination the transmission means which actuates the door means, namely the connecting shafts, the pinion means and rack means which move the door, and the structure associated with the actuating shafts which are vertically moveable adjacent the corners of the container.

Structure for opening the door member 103 on the opposite side of the longitudinal door support 126 is essentially a mirror image about the door support 126 of the structure for opening the door member 104. Thus, it can be seen that the transmission means includes first and second door pinion means mounted on the first and second connecting shafts for rotation therewith. The connecting shafts are disposed parallel to each other and cooperate with the actuating means so as to rotate in response to vertical movement of the actuating means.

It can be seen that the transmission means includes &.he door means having a door member guided for movement in the door guide means, the door member having a door rack. The transmission means further includes a door pinion means mounted for rotation and in engagement with the door rack so that rotation of the pinion means in opposite directions opens and closes the door means as required.

Because the door means in the lower wall are carried on an upper surface of the lower wall, they do not project beyond the outline of the lower wall, either when open or closed. Consequently, they do not interfere with other conventional container apparatus or equipment associated with storage and handling of containers. Thus, when the door means of the container apparatus of the invention are closed, the apparatus functions as a conventional container and has negligible limitations when compared with a conventional container.

FIGS. 1, 4, 9 and 10

The second actuating shaft 42 will now be described in greater detail, in particular with reference to means to prevent seizure of, and to limit axial movement of, the shaft with respect to the shaft guide box 78 mounted adjacent the corner of the container apparatus.

It is expected that the door opening means of the apparatus will be inoperative for long periods of time, sometimes for several weeks In a normal marine environment, the inventor appreciates that relatively long shafts mounted within guide boxes at the corners of containers would be prone to seizure unless precautions were taken. One means of reducing the chance of seizure of the shaft within the shaft guide box is to provide adequate clearance between the shaft and the guide box, thus reducing the chance of large surface areas from coming into contact with each other, which would increase chances of seizure.

Figure 9:
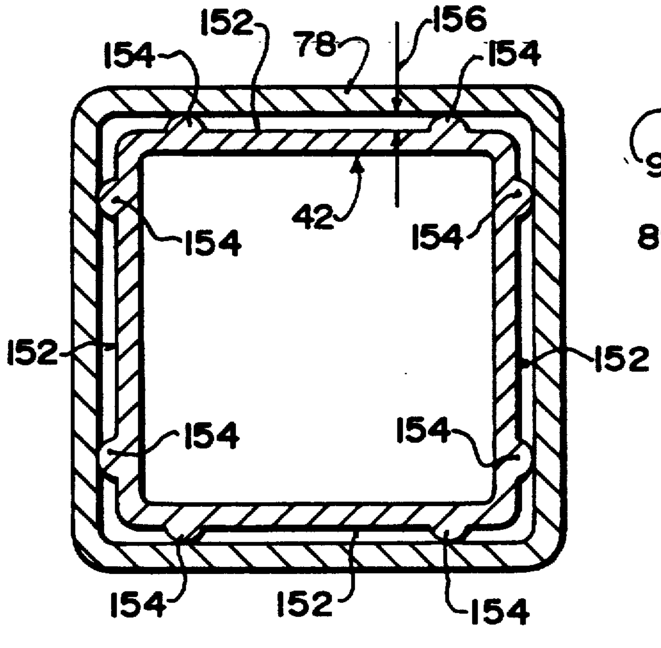
FIG. 9 is a horizontal transverse section through a portion of door actuating means.

As seen in FIG. 9, the shaft 42 is a generally square-sectioned tube, having four sides 152, each side having a pair of laterally spaced, longitudinally extending ridges 154 as shown. The ridges have partially circular cross-sections as shown, and extend outwardly from the respective side a distance of approximately 1 centimeter. The guide box 78 is a square-sectioned tube having internal dimensions which are about 2 centimeters greater than external dimensions of the sides of the shaft. Thus, a distance 156 defines a clearance opening between the inner faces of the shaft guide box and the sides of the shaft 42, with each side of the shaft having two lines of contact with the adjacent side of the guide box by way of the ridges 154. Thus, actual areas of contact between the shaft and its respective box is reduced considerably by the ridges, and this reduces chances of seizure occurring between the shaft and the box. Clearly, a small clearance is required between the ridges and the box inner surfaces to accommodate manufacturing tolerances, and distortion of the container due to loading, handling abuse, etc.

Figure 10:
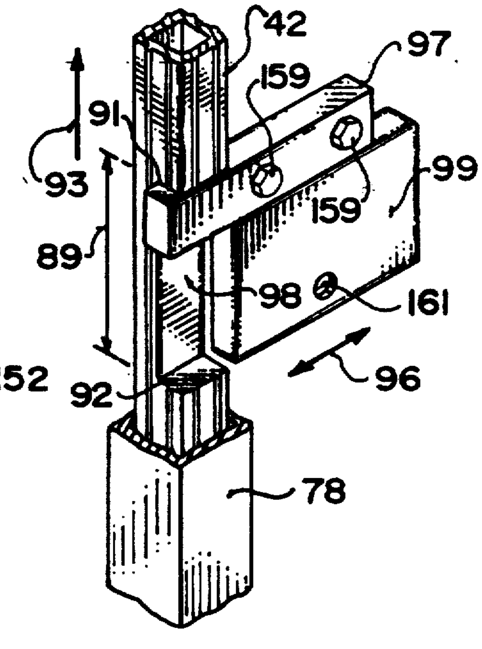
FIG. 10 is a simplified fragmented isometric view showing a portion of a door actuating means, and stop and locking structure associated therewith.

Referring to FIG. 10, the shaft stop means 97 is secured with bolts 159 to an adjacent portion of the structure so as to position the stop means at an appropriate location which determines the maximum height of the shaft 42 in the raised position, as previously described with reference to FIG. 4. The shaft 42 is shown in FIG. 10 in the lowered position in which the shoulder 91 contacts an upper surface of the stop means 97.

In the fully raised position of the shaft 42 (not shown), the shoulder 92 contacts the lower surface of the stop means 97. If the shaft means 42 requires removal for servicing, the bolts 159 can be unscrewed through tool access openings 162 (FIG. 4) in the end wall 22 of the container, which then permits the stop means 97 to be moved longitudinally outwardly through an adjacent access opening (shown in FIG. 1 only), in the adjacent side wall 18 of the container.

The shaft lock means 99 is moveable per the arrow 96 by insertion of an appropriate tool in a tool opening 161 of the lock means. An elongated tool access opening 163 (FIG. 4) is provided in the end wall 22 of the container to permit insertion of the tool for moving the locking means 99 in and out of the slot 98 of the shaft 42. When the locking means 99 is extended to pass into the slot 98, the upper surface of the locking means 99 slides along, and is closely adjacent the lower surface of the stop means 97. Because the locking means 99 is manufactured for longitudinal sliding movement, necessary clearances or lost motion would be provided adjacent the upper and lower surfaces thereof Upwards force applied to the shaft 42 is transferred through the shoulder 92 onto locking means 99. Lost motion associated with the locking means is resisted by interference of the locking means against the rigidly mounted stop means 97. Thus, any upward movement of the slidable locking means 99 is resisted by the rigidly mounted stop means 97 which facilitates transfer of force between the shaft 42 to the stop means, and thus to the container itself, as will be described. FIG. 1 shows locations of end faces of the stop means and locking means 97 and 99 respectively which, when released, can be withdrawn through openings in the side wall 18 for servicing of the shafts 42.

OPERATION

When the container apparatus is to be filled, the lower door means 38 are closed by lowering the appropriate actuating shafts 41 through 44 to their lowermost position, which usually requires a downwards force applied by a cranehead or other lifting means to the upper ends of the shafts 41–44 to overcome friction in the transmission. Each of the locking means 99 is now moved into an operative or locking position, in which the lower surface thereof is adjacent the shoulder 92 (FIG. 10) which prevents upward movement of the respective actuating shafts. Because the locking means 99 and the stop means 97 are a relatively close fit within the slot 98, vertical movement of the actuating shafts is essentially prevented. This ensures a positive closure of the lower door means 38, thus preventing accidental loss of material through the door, even when the container apparatus is subject to vibration or other disturbances.

The upper wall doors 34 are then opened, and grain or other granulated material is poured through the upper wall openings 32 until the container is filled, or has the requisite amount of material. The upper wall doors 34 are then closed, and the container can now be handled, using standard container lifting equipment as a conventional container.

When the container apparatus 10 is placed at a discharge area, the locking means 99 of each actuating shaft are slid out of engagement from the adjacent shaft by insertion of a tool through the respective elongated tool access opening 163 to engage the opening 161. The actuating shafts 41 through 44 are now engaged by conventional container lifting apparatus, and pulled upwards relative to the container, which rotates the respective shaft pinion, connecting shaft, and door pinion, resulting in simultaneous opening of all of the doors, causing material within the container to discharge through the discharge openings 36 into a receptacle below. The receptacle below can be a generally similar container with opened upper wall openings aligned with, and positioned below, the lower wall discharge openings of the upper container, permitting grain or other granular material to be transferred from an upper container to a lower container.

The upper empty container can now be removed to another area, and the lower door means 38 can be closed by positively forcing the actuating shafts downwardly relative to the container using the head or connectors of the container lifting apparatus as described.

ALTERNATIVES

FIG. 11

An alternative actuating shaft 168 does not have the asymmetrical clearance slot 98 (FIG. 4 and 10) but instead has a centrally located, longitudinally extending vertical clearance slot 169. A fixed alternative shaft stop means 171 is inserted permanently in the slot 169 and is shown located at an upper portion of the slot. An alternative axially slidable shaft locking means 173 is shown adjacent a lower portion of the slot. The slot has a vertical length or height 175 which is approximately equal to sum of vertical depths of the shaft stop means and locking means 171 and 173 respectively.

This provides a structure which is functionally similar to the clearance slot 98 and the stop means and locking means 97 and 99 of FIGS. 4 and 10, but provides a more symmetrical distribution of load to the actuating shaft. Furthermore, the shaft locking means 173 has a concave upper surface 177 which is generally complementary to a convex lower surface 179 of the shaft stop means 171. Because the stop means 171 is secured rigidly to adjacent structure of the container, the complementary surfaces 177 and 179 provide a guide means for ensuring axial movement of the locking means 173 when sliding in and out of engagement with the clearance slot 169. The shaft locking means 173 has a similar convex lower surface 181 which is mounted for sliding along a horizontal guide, not shown, secured to an adjacent portion of the container. Thus the locking means 173 is similarly guided on a lower surface thereof to ensure accurate alignment of the locking means with the stop means when upwards vertical force is applied to the shaft 168. The surface 181 is complementary to the surface 179 to ensure suitable engagement when the locking means 173 is retracted.

I claim:

1. A container apparatus having:

(a) generally horizontal, spaced apart, top and bottom walls, and vertical walls connecting the top and bottom walls to define an interior of the container apparatus, the bottom wall having at least one discharge opening therein communicating with the interior, (b) at least one door means for opening and closing the discharge opening, the door means being mounted adjacent the bottom wall of the container and being moveable relative to the discharge opening, (c) actuating means for controlling opening and closing of the discharge opening, the actuating means cooperating with, and being mounted for vertical movement relative to, the container apparatus, the actuating means having an upper end portion which includes connection means for connecting to twist lock devices, hooks or dogs of a container lifting apparatus, (d) transmission means for moving the door means in response to the said vertical movement of the actuating means, the transmission means cooperating with the actuating means and the door means.

2. An apparatus as claimed in claim 1 in which:

(a) the vertical walls include two spaced apart parallel side walls, and two spaced apart parallel end walls, the side walls and end walls being perpendicular to each other to define a generally rectangular-shaped container, the walls intersecting at four vertical corners, (b) the actuating means including at least two vertical actuating shafts located adjacent to two vertical corners of the container.

3. A container apparatus having:

(a) a generally horizontal, spaced apart, top and bottom walls, and vertical walls connecting the top and bottom walls to define an interior of the container apparatus, the bottom wall of the container apparatus having a plurality of discharge openings extending as an array of openings along a main axis of the bottom wall of the container, the bottom wall having door guide means extending transversely of the apparatus and adjacent to the respective discharge openings, (b) door members for opening and closing respective discharge openings, the door members being mounted within respective door guide means an moveable relative to the discharge opening to open and close the respective opening as required, (c) actuating means for controlling opening and closing of the discharge openings, the actuating means cooperating with, and being mounted for vertical movement relative to, the container apparatus, (d) transmission means for moving the door member in response to said vertical movement of the actuating means, the transmission means cooperating with the actuating means and the door means, the transmission means including a door rack cooperating with each door member, and a plurality of door pinion means mounted for rotation and being engaged with respective door racks, so that rotation of the pinion means in one direction opens all the discharge openings simultaneously, and rotation of the pinion means in the opposite direction closes all the discharge openings simultaneously.

4. An apparatus as claimed in claim 1 in which:

(a) the bottom wall has door guide means extending adjacent to the discharge opening to mount the door means for movement relative to the discharge opening, (b) the door means has a door member guided for movement in the door guide means, and in which the transmission means includes:

(c) a door rack cooperating with the door member, (d) a door pinion means mounted for rotation and in engagement with the door rack so that rotation of the pinion means in opposite direction opens and closes the door means as required.

5. An apparatus as claimed in claim 4 in which:

(a) the door pinion means is mounted on a connecting shaft for rotation therewith, (b) the connecting shaft cooperates with the actuating means so as to rotate in response to vertical movement of the actuating means.

6. An apparatus as claimed in claim 5 in which:

(a) the actuating means includes at lest one vertical actuating shaft mounted for axial movement along a longitudinal axis thereof, and the transmission means further includes:

(b) the actuating shaft having a lower end portion, having a shaft rack, (c) a shaft pinion means in engagement with the shaft rack, the shaft pinion being mounted on the connecting shaft for rotation therewith.

7. An apparatus as claimed in claim 1 in which:

(a) the bottom wall has first and second door guide means located on opposite sides of the discharge opening, with an axis of the container apparatus passing across the discharge opening, the door guide means on one side of the axis being aligned with the door guide means on an opposite side of the axis, (b) the door means includes a pair of oppositely disposed first and second door members on opposite sides of the axis, each door member being mounted in respective door guide means to permit aligned movement towards each other to close the opening, and aligned movement away from each other to open the opening, and the transmission means includes:

(c) first and second door toothed racks cooperating with the first and second door members respectively, (d) first and second door pinion means for each door member, each door pinion means being mounted for rotation and in engagement with the respective first and second door toothed racks so that rotation of the door pinion means in appropriate opposite directions opens and closes the opening by moving the respective door members as required.

8. An apparatus as claimed in claim 7 in which:

(a) the first and second door pinion means are mounted on first and second connecting shafts for rotation therewith, the connecting shafts being disposed parallel to each other and cooperating with the actuating means so as to rotate in response to vertical movement of the actuating means.

9. An apparatus as claimed in claim 8 in which:

(a) the actuating means includes at lest first and second vertical actuating shafts, each shaft being mounted for axial movement along a respective longitudinal axis thereof, the first and second actuating shafts being adjacent ends of the first and second connecting shafts respectively, and the transmission means includes:

(b) a shaft rack provided at a lower end portion of each actuating shaft, (c) first and second shaft pinions in engagement with the first and second shaft racks, the shaft pinions being mounted on the respective connecting shafts for rotation therewith.

10. An apparatus as claimed in claim 1 further including:

(a) transmission housing means for preventing essentially contamination of the transmission means with material contained within the container, (b) the transmission housing means having downwardly and inwardly inclined wall members which enclose the transmission means to prevent contamination thereof, and concurrently serve as hopper means to direct material within the container apparatus toward the opening.

11. An apparatus as claimed in claim 5, further including:

(a) a transmission housing including an inclined chute wall member extending between one vertical wall and the bottom wall of the container adjacent said at least one discharge opening of the container, so that portions of the chute wall member, the bottom wall and the vertical wall define an enclosure to receive at least a portion of the connecting shaft passing therethrough, (b) the inclined chute wall member being spaced sufficiently apart from the vertical wall so as to provide clearance for the door pinion means so as to enclose the door pinion means to prevent contamination of the door pinion means and respective door rack, (c) the inclined chute wall member also serving as a portion of a hopper means to direct material within the container towards the discharge opening.

12. An apparatus as claimed in claim 1, in which:

(a) said at least one discharge opening in the bottom wall of the contain comprises a plurality of discharge openings extending as an array of openings along a main axis of the bottom wall of the container, the bottom wall having door guide means extending transversely of the apparatus and adjacent to the respective discharge openings, (b) said door means comprises a plurality of door members, and each discharge opening has a respective door member mounted within and guided for movement in the respective door guide means, each door member being moveable relative to the respective discharge opening to open and close at least a portion of the respective opening as required, and the transmission means includes:

(c) a door toothed rack provided for each door member, (d) a plurality of door pinion means mounted for rotation and engaged with respective door racks, so that rotation of the pinion means in one direction opens all the door means simultaneously, and rotation of the pinion means in the opposite direction closes all the door means simultaneously.

13. An apparatus as claimed in claim 12 in which the transmission includes:

(a) first and second connecting shafts extending parallel to the main axis of the container and having opposite ends cooperating with respective actuating means so as to rotate in response to vertical movement of the actuating means, (b) the door pinion means are mounted on a respective connecting shaft for rotation therewith.

14. An apparatus as claimed in claim 13 in which:

(a) the actuating means includes four actuating shafts mounted for axial movement along respective longitudinal axis thereof, the actuating shafts being adjacent respective vertical corners of the container, and the transmission means includes:

(b) each actuating shaft having a respective lower end portion having a respective shaft rack, (c) a plurality of shaft pinion means, each shaft pinion means being in engagement with a respective shaft rack, the shaft pinion means being mounted on a respective connecting shaft for rotation therewith to rotate the respective door pinion means.

15. An apparatus as claimed in claim 1, further including:

(a) stop mean for limiting upwards movement of the actuating means beyond a raised position thereof, and to support weight of the container when the actuating means is in the raised position.

16. An apparatus as claimed in claim 1, further including:

(a) locking means for preventing vertical movement of the actuating means when engaged therewith, the locking means cooperating with the structure adjacent one wall of the container and the actuating means so as to be brought into engagement with the actuating means as required.

17. An apparatus as claimed in claim 16, in which:

(a) the actuating means has a clearance slot, (b) the locking means is slideable into the clearance slot to engage the actuating means to prevent movement thereof.

18. An apparatus as claimed in claim 17, in which:

(a) the apparatus further includes top means for limiting upwards movement of the actuating means beyond a raised position thereof, and for supporting weight of the container when the actuating means is in the raised position, (b) the clearance slot has upper and lower shoulders defining a length of the clearance slot, (c) the stop means being fixed relative to the container apparatus and projecting into the slot to engage at least the lower shoulder thereof to limit upwards movement of the actuating means.

19. An apparatus as claimed in claim 18, in which:

(a) the stop means is disposed above the locking means and has a vertical depth, (b) the locking means has a vertical depth and is located closely adjacent the stop means, so that sum of the vertical depths of the stop means and the locking means is approximately equal to the length of the clearance slot, so that when the locking means is engaged, the stop means and locking means occupy a space between the shoulders of the slot.

20. An apparatus as claimed in claim 18, in which:

(a) the stop means is disposed above the locking means and has a lower surface, (b) the locking means has an upper surface located closely adjacent the lower surface of the stop means, the lower surface of the stop means being complementary to the upper surface of the locking means to serve as guide means for ensuring essentially axial movement of the locking means relative thereto.

21. A container apparatus having:

(a) generally horizontal, spaced apart, top and bottom walls, and vertical walls connecting the top and bottom walls to define an interior of the container apparatus, the bottom wall having at least one discharge opening therein communicating with the interior, and door guide means extending adjacent to the discharge opening, (b) a door member for opening and closing the discharge opening, the door member being mounted adjacent the bottom wall of the container and guided for movement in the door guide means relative to the discharge opening, (c) actuating means for controlling opening and closing of the discharge opening, the actuating means cooperating with, and being mounted for vertical movement relative to, the container apparatus, the actuating means including at least one vertical actuating shaft mounted for axial movement along a longitudinal axis thereof, (d) transmission means for moving the door member in response to said vertical movement of the actuating means, the transmission means cooperating with the actuating means and the door member, the transmission means including a door rack cooperating with the door member, a journalled connecting shaft, and a door pinion means mounted for rotation with the connecting shaft and being in engagement with the door rack so that rotation of the door pinion means in opposite directions opens and closes the door member as required, the transmission means further including a shaft rack on a lower end portion of the actuating shaft, and a shaft pinion means in engagement with the shaft rack, the shaft pinion means being mounted on the connecting shaft for rotation therewith so as to rotate the connecting shaft in response to vertical movement of the actuating shaft, which in turn moves the door member.

* * * * *